3,052,161
ADJUSTABLE EYEGLASS TEMPLE
Francois Berend, 43 Ave. d'Auteuil, Boulogne-sur-Seine, Seine, France
Filed Oct. 29, 1959, Ser. No. 849,556
Claims priority, application France Mar. 12, 1959
4 Claims. (Cl. 88—52)

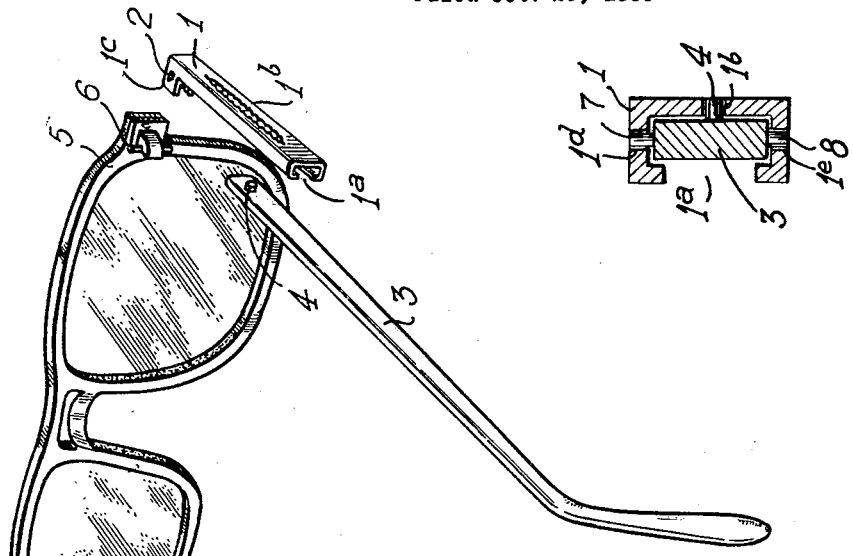
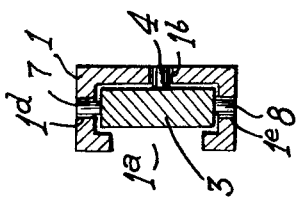
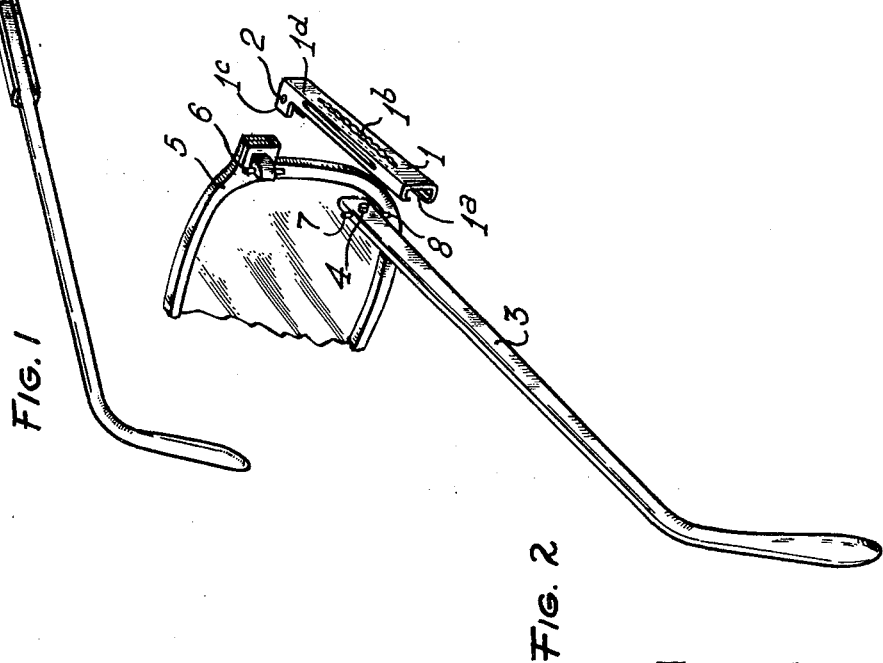
François Berend
INVENTOR
BY Karl F. Ross
Agent

# United States Patent Office 3,052,161
Patented Sept. 4, 1962

This invention relates to spectacle mountings and has specific reference to improvements in adjustable eyeglass temples and the like with a view to simplifying their manufacture and increasing their strength while enabling their use by unskilled persons.

It is known that the length of temple arms of spectacles varies from one wearer to another.

This variety of sizes and the necessity of providing a complete range of temple-arm length which results therefrom creates special problems with regard to safety spectacles, that is, spectacles required by safety regulations in workshops, laboratories and the like, or provided as a precautionary measure, since it is hardly possible to stock beforehand a complete range of spectacle sizes. Under these conditions, the worker will frequently receive spectacles ill-suited to his face and in many cases will decline to wear them owing to the resulting discomfort.

The spectacle mounting according to this invention is characterized essentially in that each temple arm consists of two detachable elements longitudinally adjustable at will in relation to each other.

Further particulars and advantages of the invention will appear in the course of the description that follows, reference being made to the accompanying drawing, given by way of non-restrictive example, which will make clear how the present invention may be put into practice.

In the drawing:

FIGURE 1 is a perspective view of a spectacle having an adjustable temple according to this invention;

FIGURE 2 is a fragmentary perspective view showing a modified embodiment of the adjustable temple arms; and FIGURE 3 is a section taken across a temple arm constructed according to the teachings of this invention.

As shown in FIG. 1, each temple arm of the spectacle mounting consists of two members 1, 3, that is, a front member or element 1 and a rear member or element 3. The front element 1 carries hinge means 2 and consists of a length of rectangular-cross-section tube provided with a longitudinal slot 1a and formed along the side opposite to this slot with a second longitudinal slot 1b having saw-tooth edges.

The rear element 3 is bent in the manner of conventional spectacle earpieces for accommodating the curvature of the wearer's ear; it has a rectangular cross-section and dimensions corresponding substantially to the inner dimensions of the front element 1 for sliding frictional engagement therein.

The rear element 3 is provided with a pin 4 projecting laterally and engageable in the saw-tooth slot 1b of the front element 1 so as to be retained in any selected longitudinal position therein.

To this end, the wearer has simply to move the rear element 3 longitudinally relative to the front element 1 for transferring the pin 4 from one notch to another, due to the inherent elasticity of the material from which the sawtooth edges of the slot 1b are made (this material consisting for example of superpolyamide, polystyrene, polyethylene, polyvinyl chloride or the like).

To prevent the rear element 3 from being accidentally separated from the front element 1, the front element 1 is provided with a pair of additional longitudinal slots 1d, 1e formed through its upper and lower walls, as shown, that is, in a place extending normally to the plane of the notched slot 1b. A pair of pins 7, 8 projecting from and embedded in the upper and lower faces of the rear element 3 (at the front end thereof) engage these additional slots 1d and 1e.

By virtue of the inherent elasticity of the material constituting the rear element 3 (which may advantageously consist of superpolyamide, polystyrene, polyethylene, polyvinyl chloride, etc.) one or both pins 7, 8, yield temporarily to permit the insertion of the rear element 3 into the front element 1.

Thus, no untimely or accidental separation of the two elements 1, 3, can take place since it requires the application of a relatively substantial force to bend the pins 7, 8.

The temple arm is also separable from the front bar 5 owing to the inherent resiliency of the material constituting the hinge pin 6 co-acting with the hinge holes 2 formed in the substantially fork-shaped front end 1c of the front element 1, with which the hinge pin 6 constitutes a plastic hinge.

Of course it will readily occur to anybody conversant with the art that many modifications and alterations may be made in the embodiments shown and described herein, i.e. by forming the rear element 3 with the additional slot or slots and causing the pin or pins 7 and/or 8 to project inwardly from the walls of the tubular section of element 1.

This last-mentioned arrangement is particularly advantageous for it permits the assembly of the various component elements just before using the spectacles and makes these elements interchangeable.

Besides, the relative dimensions as well as the material employed in the manufacture of the component elements of the spectacle mountings according to this invention may be varied without departing from the spirit and scope of the invention as set forth in the appended claims.

What I claim is:

1. An adjustable temple for an eyeglass frame, comprising a resiliently deformable generally elongated front member pivotally connectable to said frame at one extremity of said front member, said front member being provided with a first longitudinal throughgoing slot open at its other extremity, and a generally elongated rear member terminating in an ear-engaging bend while being insertable into said front member through said slot, said front member being provided with wall portions at least partially enclosing a forward portion of said rear member and forming a longitudinal channel therefor, said forward portion being removably and slidably displaceable in said channel, one of said wall portions being formed with a closed throughgoing longitudinal second slot opposite said first slot while having notched longitudinal edges of limited separability, said front portion being provided with a pin extending into said second slot and selectively engageable with the notches of said edges for adjustably indexing said rear member in a plurality of positions of relative adjustment upon a relative displacement of said members in longitudinal direction so that said pin cammingly spreads said edges and permits shifting of said pin along said second slot whereby the distance of said bend from said frame can be varied.

2. A temple according to claim 1 wherein said wall portions comprise a pair of spaced-apart parallel wall members and a connecting wall member bridging said parallel wall members and provided with said second slot, at least one of said parallel wall members having a longitudinal throughgoing opening, said forward portion being provided with a further pin extending into said opening for preventing transverse displacement of said forward portion within said channel.

3. An adjustable temple for an eyeglass frame, comprising a resiliently deformable generally elongated member pivotally connectable to said frame at one extremity of said front member, said front member being provided with a first longitudinal throughgoing slot open at its other extremity, and a generally elongated rear member terminating in an ear-engaging bend while being insertable into said front member through said slot, said front member being provided with a pair of spaced-apart parallel wall members and a connecting wall member bridging said parallel wall members and forming a channel, said rear member being provided with a forward portion of generally rectangular cross-section removably received in said channel and slidably displaceable therein, said connecting wall member being provided with a closed throughgoing longitudinal second slot opposite said first slot while having notched longitudinal edges of limited separability, said front portion having a pin extending transversely from said rear member into said second slot and selectively engageable with the notches of said edges for adjustably indexing said rear member in a plurality of longitudinal positions of relative adjustment upon a relative displacement of said members in longitudinal direction so that said pin cammingly spreads said edges and permits shifting of said pin along said second slot whereby the distance of said bend from said frame can be varied.

4. A temple according to claim 3 wherein said parallel wall members are each provided with a longitudinal throughgoing opening, said forward portion being provided with a pair of projections each extending into a respective one of said openings for preventing transverse displacement of said forward portion within said channel.

References Cited in the file of this patent

UNITED STATES PATENTS

| | | |
|---|---|---|
| 2,210,507 | Spill | Apr. 6, 1940 |
| 2,443,249 | Jackson | June 15, 1948 |
| 2,887,929 | Farmer | May 26, 1959 |

FOREIGN PATENTS

| | | |
|---|---|---|
| 802,839 | Great Britain | Oct. 15, 1958 |